(12) United States Patent
Brunner et al.

(10) Patent No.: US 6,570,132 B1
(45) Date of Patent: May 27, 2003

(54) REMOTE REGULATION UNIT FOR A WELDING APPARATUS OR A POWER SOURCE

(75) Inventors: Michael Brunner, Seiersberg (AT);
Michael Zauner, Alkoven (AT);
Helmut Friedl, Sipbachzell (AT);
Friedrich Oberzaucher, Wels (AT)

(73) Assignee: Fronius Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/889,092

(22) PCT Filed: Jan. 14, 2000

(86) PCT No.: PCT/AT00/00008

§ 371 (c)(1),
(2), (4) Date: Jul. 11, 2001

(87) PCT Pub. No.: WO00/41835

PCT Pub. Date: Jul. 20, 2000

(30) Foreign Application Priority Data

Jan. 15, 1999 (AT) .................................................. 52/99

(51) Int. Cl.[7] ................................................ B23K 9/10
(52) U.S. Cl. ...................................................... 219/132
(58) Field of Search ............................... 219/132, 130.5

(56) References Cited

U.S. PATENT DOCUMENTS

| | | | | |
|---|---|---|---|---|
| 2,175,891 A | * | 10/1939 | Graham | ...................... 219/132 |
| 2,526,597 A | * | 10/1950 | Winslow | ...................... 219/132 |
| 4,216,367 A | * | 8/1980 | Risberg | ...................... 219/132 |
| 4,266,114 A | | 5/1981 | Hansen | |
| 5,039,835 A | | 8/1991 | Schwiete | |
| 5,276,305 A | | 1/1994 | Hsien | |
| 6,040,555 A | * | 3/2000 | Tiller et al. | .................. 219/132 |

FOREIGN PATENT DOCUMENTS

| | | |
|---|---|---|
| DE | 29 04 458 | 4/1978 |
| DE | 33 29 216 | 2/1984 |
| DE | 41 21 740 | 1/1992 |
| EP | 0 575 082 | 12/1993 |
| EP | 0 622 768 | 11/1994 |
| JP | 61-033768 | 2/1986 |
| JP | 04-162966 | 6/1992 |
| WO | WO98/25726 | 6/1998 |

* cited by examiner

Primary Examiner—Clifford C. Shaw
(74) Attorney, Agent, or Firm—Collard & Roe, P.C.

(57) ABSTRACT

The invention describes a method of operating a data exchange between an external component, in particular a remote control unit (23), and a welding unit (1), in particular a current source. A serial data exchange is run between a welding unit (1), in particular a current source, and an external component, in particular a remote control unit (23), directly across the welding lines, in particular across the connecting lines (36) to the welding torch (10) and to the workpiece (16), on the basis of digital levels.

17 Claims, 3 Drawing Sheets

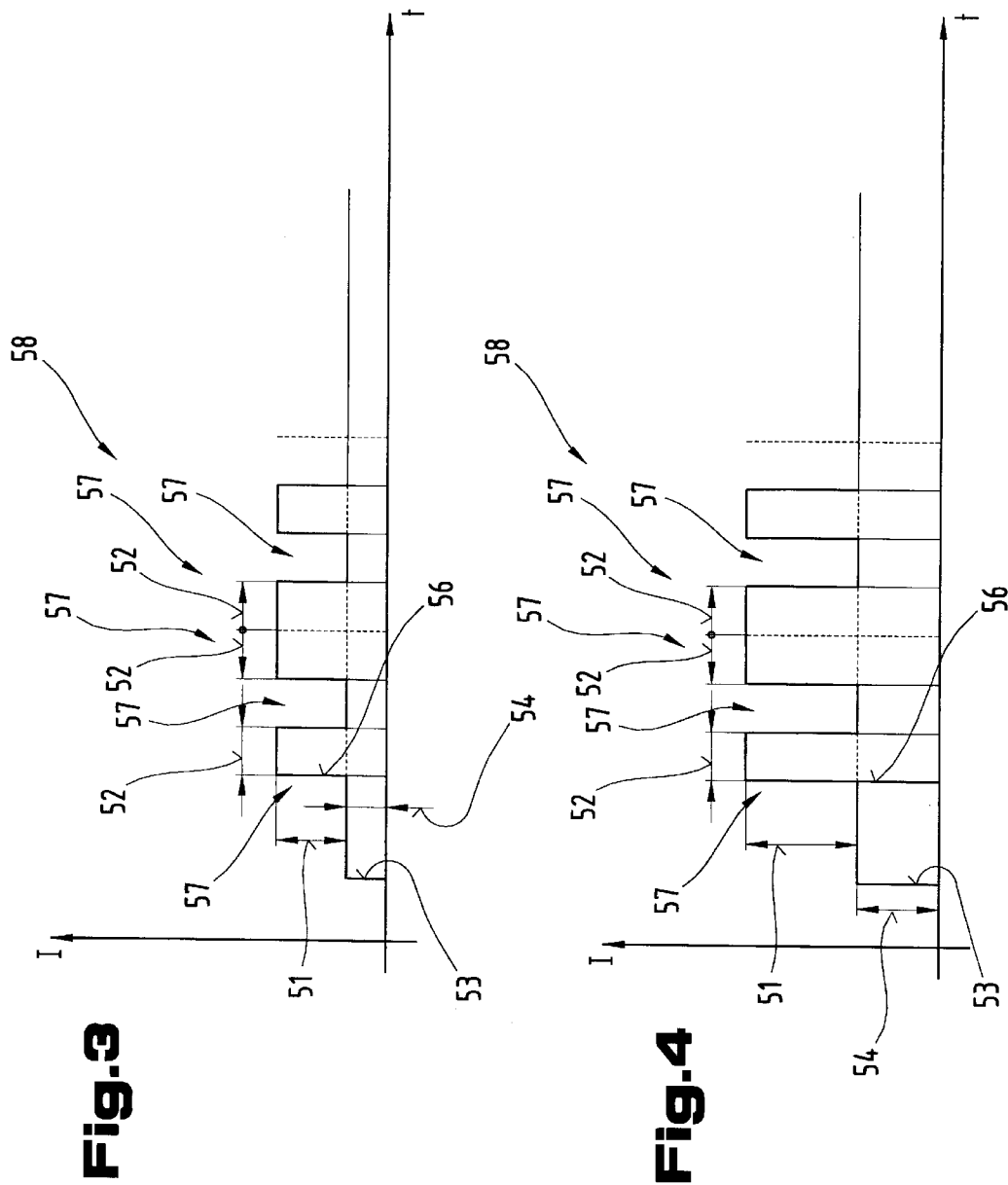

REMOTE REGULATION UNIT FOR A WELDING APPARATUS OR A POWER SOURCE

CROSS REFERENCE TO RELATED APPLICATIONS

Applicants claim priority under 35 U.S.C. §119 of Austrian Application No. A 52/99 filed Jan. 15, 1999. Applicants also claim priority under 35 U.S.C. §365 of PCT/AT00/00008 filed Jan. 14, 2000. The international application under PCT article 21 (2) was not published in English.

The invention relates to a method of exchanging data between a remote control unit and a current source of a welding unit, and to a remote control unit used in such a method.

An arc welding machine is known—as disclosed in DE 29 04 458 A1—in which an adjustable power component for generating a welding current can be controlled via a control system. To this end, the power component is connected to an electrode holder and the workpiece by respective welding power cables and is equipped with an adjustment system co-operating with the control system which can be adjusted manually or by means of a remote control unit. The remote control unit is disposed between the workpiece and the electrode holder, in particular a welding torch, and has a manually operable device for adjusting the welding current. This remote control unit co-operates with a detection system in the control system of the welding unit. The current input of the remote control unit is adjusted via the remote control unit, whereby the power input can be increased. The change in current flowing to the remote control unit is detected by the detection system and the desired value for the welding current adjusted accordingly. The disadvantage of this system is that external influences can trigger changes in resistance in the control circuit, which can lead to an increase in no-load current and hence to an incorrect adjustment of the desired value for the welding device.

Another arc welding machine with an adjustable power component is known—as disclosed in DE 33 29 216 A1—in which a remote control unit is used between the conducting surfaces of a workpiece and a welding electrode. Depending on the sequence of the conducting surfaces and the polarity of the workpiece and welding electrode, a higher or lower frequency of welding voltage is superimposed on the welding voltage. A control device in the welding unit increases or reduces the welding current until the control circuit or current circuit is closed via the power component. The disadvantage of this system is that the resetting procedure or setting procedure has to be repeated several times in order to run intermediate welding tests to ascertain whether the newly set desired value for the welding current corresponds to the desired value.

The underlying objective of the present invention is to propose a remote control unit, offering a simple way of setting the exact desired value of a welding parameter in a welding unit remotely.

This objective is achieved by the invention with a method of exchanging data between an external component consisting of a remote control unit having two inputs, and a current source of a welding unit, comprising the steps of carrying out a serial data exchange between the welding unit and the remote control unit, directly across welding lines constituting connecting lines to a welding torch and to a workpiece, on the basis of digital levels, carrying out a two-way data exchange between the current source of the welding unit and the external component consisting of the remote control unit, establishing a continuous current flow between the two inputs via a switching device of the remote control unit and forming the digital levels in such a way that when a switch component of the switching device is closed a total resistance value between the two inputs of the remote control unit is changed. The advantage of this system is that by using a serial data exchange in the form of a data protocol, a large amount of data can be transferred, which means that a large number of different welding parameters can be amended with only one remote control unit. Another advantage resides in the fact that because a two-way data exchange is operated, individual welding parameters, in particular their desired values for the welding unit or the current source, can be consulted and then shown on the display of the remote control unit, enabling the user to take a reading, and/or amended.

Other advantageous features are defined in claims 2 to 6. The advantages which they offer can be taken from the detailed description of the drawings.

The objective of the invention is also achieved with a remote control unit for a current source of a welding unit, the remote control unit comprising at least one setting unit and a current supply unit, and in order to activate the remote control unit it is placed in contact by means of a respective input with a workpiece and an electrode holder; a digitally programmable logic unit connected to a switching device which comprises at least one resistor and a switch component, in order to generate digitally sequential levels, the switch component being in turn connected to an input for the electrode holder and the workpiece, and another resistor is connected in parallel with the switch component to form a continuous current flow in the switching device. The resultant advantage is that the design of the remote control unit permits a serial data transmission, which means that any amount of data can be transferred. Another advantage is that it offers a simple way of selecting different welding parameters by activating a setting element on the remote control unit, so that when using the remote control unit the user has the option of amending the desired value for every welding parameter without having to enter a setting from the input and/or output device on the welding unit.

In one application of a remote control unit of this type, a two-way data exchange can advantageously be operated between the remote control unit and the welding unit, which means, for example, that if the user enters an incorrect setting, it can be detected by the control system of the welding unit and the user can be alerted to the fact by the control system, which transmits a corresponding data protocol to the user via the remote control unit.

Other advantageous embodiments are defined in claims 8 to 18. The advantages achieved as a result are explained in the detailed description of the drawings.

The invention will be described in more detail with reference to embodiments illustrated in the drawings as examples.

Of these:

FIG. 3 is a simplified, schematic diagram of a data protocol from the remote control unit to the welding unit;

FIG. 4 is another simplified, schematic diagram of a data protocol from the welding unit to the remote control unit.

Figure 1:
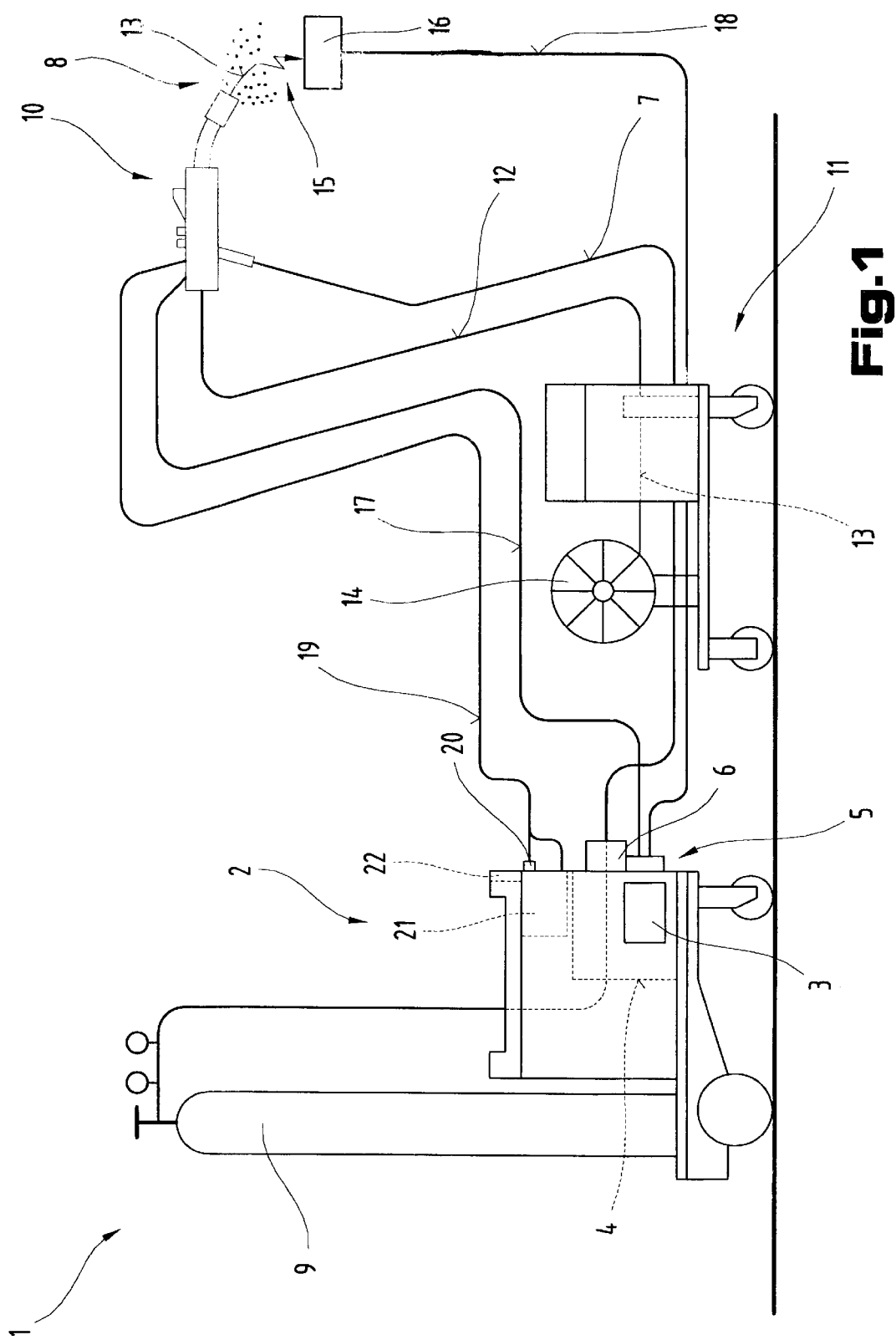
FIG. 1 is a simplified diagram schematically illustrating the structure of the welding unit.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding unit 1 for performing the most varied of welding processes, e.g. MIG/MAG welding or TIG welding or electrode welding processes.

The welding unit 1 has a current source 2 with a power component 3, a control system 4 and a switching element 5 co-operating with the power component 3 and the control system 4. The switching element 5 or control system 4 is connected to a control valve 6, which is arranged in a supply line 7 for a gas 8, in particular an inert gas such as $CO_2$, helium or argon and similar, between a gas storage 9 and a welding torch 10.

A wire feed device 11 such as commonly used in MIG-MAG welding may also be activated via the control system 4 enabling a welding wire 13 to be fed via a supply line 12 from a supply drum 14 to the region of the welding torch 10. The current needed to strike an arc 15 between the welding wire 13 and a workpiece 16 is delivered via a supply line 17 from the power component 3 of the current source 2 to the welding torch 10 and the welding wire 13, the workpiece 16 to be welded also being connected to the welding unit 1 via another supply line 18 so that a current circuit can be set up across the arc 15.

In order to cool the welding torch 10, the welding torch 10 may be connected via a coolant circuit 19 with an inter-connected flow indicator 20 to a water container 21, so that when the welding torch 10 is switched on the coolant circuit 19 can be switched on by the control system 4 in order to cool the welding torch 10 and the welding wire 13.

The welding unit 1 also has an input and/or output device 22, by means of which the most varied of welding parameters and operating modes of the welding unit 1 can be set. Welding parameters set via the input and/or output device 22 can be forwarded to the control system 4, which then activates the individual components of the welding unit 1.

Instead of using individual lines to connect the individual components to the welding unit 1 and the wire feed device 11 in particular, as illustrated in the embodiment given as an example here, it would also be possible to incorporate these individual lines in a common hose pack which is then connected to the welding torch 10.

Figure 2:
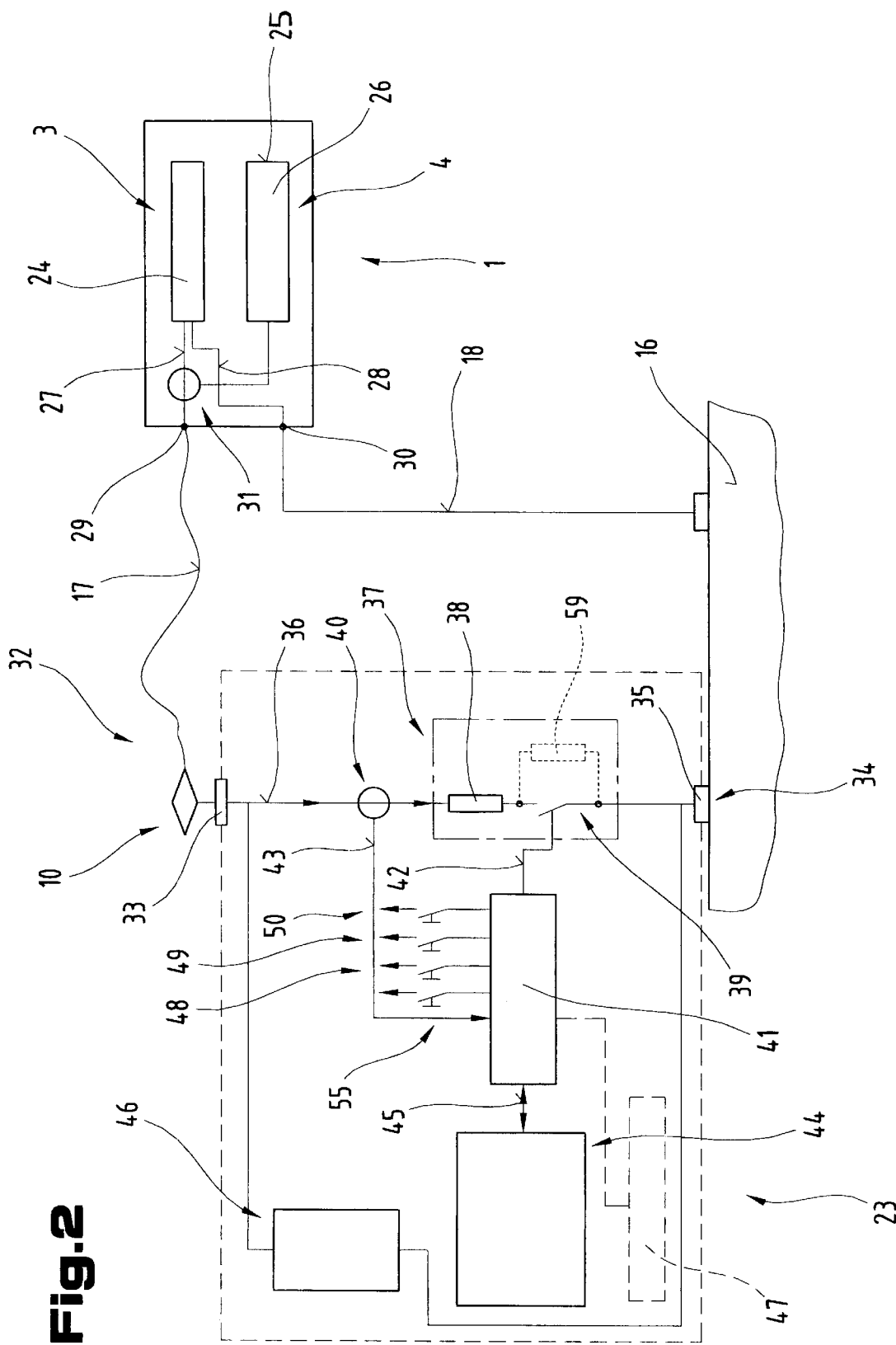
FIG. 2 is a simplified, schematic block diagram of a remote control unit proposed by the invention for a welding unit or a current source.

FIG. 2 is a schematic block diagram of the welding unit 1 and a remote control unit 23 as proposed by the invention.

The welding unit 1 is schematically illustrated by means of the power component 3 and the control system 4, the power component 3 being provided in the form of an inverter current source 24, for example. In order to control or regulate the inverter current source 24, the power component 3 is connected via a data bus 25, for example, in particular a digital data bus, to the control system 4. The control system 4 may be provided in the form of a microprocessor controller 26, for example. Since the individual components of the welding unit 1, namely the inverter current source 24 and the microprocessor controller 26, may be any inverter current source 24 and microprocessor controller 26 known from the prior art, for the sake of simplicity these components will not be described in detail. Other components of the welding unit 1, such as the input and/or output device 22 and the wire feed device 11, may be connected to the control system 4, in particular the microprocessor controller 26, as described with reference to FIG. 1, i.e. these components can be linked to the control system 4 by a data connection, completing the structure of the welding device 1.

In the block diagram of the welding unit 1 illustrated here, the power component 3 is connected to connecting sockets 29, 30 via lines via lines 27, 28. These connecting sockets 29, 30 are designed so that a hose pack can be connected to the welding unit 1 in a manner known from the prior art. The supply lines 17, 18 for the welding torch 10 and the workpiece 16 are plugged into these connecting sockets 29, 30. The welding torch 10 and the workpiece 16 are schematically shown in the embodiment illustrated as an example here. As may be seen, however, a current circuit can be set up with the power component 3 across the supply lines 17, 18.

In order to be able to regulate or control the power component 3 from the control system 4, a detection system 31 is provided in the welding unit 1. This detection system 31 is schematically shown in the line 27 at the output of the power component 3, in other words between the power component 3 and the connecting socket 29 or 30. The detection system 31 may be any shunt known from the prior art, for example, in which case the flow of current from the power component 3 through line 27 can be detected and a regulation or control applied by the control system 4 based on the actual values detected, in particular for the current and voltage. The control system 4 applies adjustments or controls by means of software, i.e. appropriate software programmes are loaded into the microprocessor controller 26 from a memory so that the power component 3 can be regulated and/or controlled on the basis of a desired/actual comparison.

In the embodiment illustrated as an example here, the remote control unit 23 is arranged between the welding torch 10 and the workpiece 16, i.e. the welding torch 10, in particular the welding wire 13 forming the electrode, is placed in contact with an electrode holder 32. This electrode holder 32 forms a first input 33 of the remote control unit 23. The remote control unit 23 is simultaneously placed in contact with another electrode holder 34, which again forms an input of the remote control unit 23. By providing the remote control unit 23 between the welding torch 10 and the workpiece 16, the remote control unit 23 can be supplied with current by the power component 3, i.e. when the welding wire 13 is placed in contact with the first input 33 and the other input 35 is placed in contact with the workpiece 16, a current circuit is established with the power component 3, in particular with the inverter current source 24, across the two supply lines 17, 18.

The remote control unit 23 is constructed so that a connecting line 36 fitted with a switching device 37 is provided between the two inputs 33, 35, thereby enabling a current circuit to be set up from the power component 3 across the supply line 17, the connecting line 36, the workpiece 16 and the supply line 18.

The switching device 37 has a first resistor 38 and a switch component 39 and when the switch component 39 is activated, a current circuit with a constant flow of current is established between the inputs 33 and 35 through the resistor 38. The switch component 39 may be provided in the form of a transistor, triac or any other electrical switching element, for example. Clearly, any switching device 37 could be used although care must be taken to ensure that when the switching device 37 is activated, a constant current flow is generated between the inputs 33, 35, i.e. by assigning the resistor 38 with an appropriate rating, a constant current flow is generated from the power component 3.

So that this current flow across the connecting line 36 can be detected by the remote control unit 23, the latter also has a detection system 40. Again, this detection system 40 may be a shunt of a known type or any other detection system 40 known from the prior art which is capable of detecting a current flow. To enable the switching device 37 to be controlled and the current flow detected by the detection system 40 to be processed, the remote control unit 23 has a logic unit 41. The logic unit 41 may be provided in the form of a microprocessor controller or any other digital component, such as self-programmable chips.

An output of the logic unit 41 is connected via a control line 42 to an input of the switch component 39, so that the switch component 39 can be activated when the output of the logic unit 41 is activated via the control line 42, i.e. the switch component 39 is closed and a flow of current can be built up via the connecting line 36 from the welding torch 10 to the workpiece 16. The detection system 40 is connected to the input of the logic unit 41 by at least one line 43, which is how actual values detected by the detection system 40 are forwarded to the logic unit 41.

To enable a user to operate the welding unit 1 remotely, a setting unit 44 is connected to the logic unit 41 by means of at least one line 45. The setting unit 44, for example, may be any known potentiometer or keypad, so that by changing the resistance value of the potentiometer in the setting unit 44, the user can set a new desired value for the logic unit 41, in particular for the welding unit 1, i.e. when the potentiometer is adjusted, the logic unit 41 converts to a corresponding desired value for a welding parameter, for example the current rating, so that, via the remote control unit 23, the setting on the welding unit 1 for the current, in particular the current rating, can be amended from the remote control unit 23, as will be explained in more detail below.

To this end, if using individual keys to change a pre-set value, in particular a desired value, these can be directly connected to the logic unit 41 since the logic unit 41 converts the individual key pulses or evaluates a period for operation of the key, enabling the switch component 39 to be activated accordingly. As a result, only levels "0" and "1" are logically generated or available in the remote control unit 23, which simplifies dimensioning of the individual components.

In order to supply current and voltage to the individual components of the remote control unit 23, a current supply unit 46 is provided in the remote control unit 23. This current supply unit 46 is designed so as to be connected to the two inputs 33, 35 of the remote control unit 23, which ensures that energy is supplied when the remote control unit 23 is placed in contact with the welding torch 10 and the workpiece 16 irrespective of the states of the individual components, i.e. by means of this current flow or energy supply, the current supply unit 46 sets up a corresponding operating voltage for the analogue and digital components of the remote control unit 23 enabling the remote control unit 23 to operate. For the sake of clarity, however, the current supply lines for the individual components are not illustrated.

To this end, the individual components such as the switch component 39, the resistor 38 and the detection system 40 may be integrated in the current supply unit 46. As a result only a single current circuit is established in the remote control unit 23.

The individual components of the remote control unit 23 described above represent the minimum requirements for the remote control unit 23 proposed by the invention, i.e. with these components, the user will be able to set or adjust a specific welding parameter on the welding unit 1 from the remote control unit 23. Clearly, however, this remote control unit 23 could incorporate other components to facilitate or assist user-operation.

This being the case, the logic unit 41 might be connected to a display 47, for example. This display 47 may be provided in the form of an LCD, for example, so that when the user is setting a specific value for a welding parameter via the setting unit 44, this change can be shown on the display 47. Furthermore, several setting elements 48 to 50 may be connected to the logic unit 41 via inputs. These setting elements 48 to 50 may provided in the form of standard commercially available switches.

With the setting elements, 48 to 50, the user will have the possibility of selecting different welding parameters, i.e. for example, the setting element 48 might be assigned to the current, setting element 49 to voltage and setting element 50 to the wire feed rate, so that when one of these setting elements 48 to 50 is operated, the corresponding welding parameter is remotely set on the welding unit 1 via the remote control unit 23. Of course, at least one additional setting element 48 may be provided, by means of which the user can call up the individual welding parameters in cycles, i.e. operating this setting element 48 will scroll onto the next welding parameter giving the option of selecting any higher number of welding parameters.

When the remote control unit 23 is incorporated in its application, a user will be able to amend at least one welding parameter in the welding unit 1 from the remote control unit 23, but the remote control unit 23 proposed by the invention can be used to exchange data or transfer data between the remote control unit 23 and the welding unit 1 or a current source in digital form, i.e. a serial data transmission or a serial data exchange is operated between the current source 2, in particular the welding unit 1, and an external device, in particular the remote control unit 23, directly across the welding lines, in particular the supply line 17, 18 with digital levels, in particular with "logic 1" and "logic 0" levels. In a data exchange or data transfer of this type, a serial data protocol is established by the remote control unit 23 as is usually the case with a data exchange known from the prior art, for example a computer, which is then transmitted or transferred to the welding unit 1 via the supply lines 17, 18. The data protocol is set up in the logic unit 41 and the digital levels or signals "1" and "0" are generated when the switch component 39 is activated.

The operating sequence for setting a welding parameter from the remote control unit 23 will now be described with reference to the embodiment illustrated as an example in FIG. 2 and taking an extract from a serial data protocol, as illustrated in the diagrams of FIGS. 3 and 4.

To enable a user of a welding unit 1 of this type to set or amend a welding parameter from the remote control unit 23, he must firstly establish a contact between the remote control unit 23 and the workpiece 16 via the input 35. To this end, the input 35, in particular the electrode holder 34, may be provided in the form of a magnet, making it easy to place the remote control unit 23 in fixed contact with the surface of the workpiece 16. As a result, the input 35 is connected to the power component 3 of the welding unit 1 or current source 2 by means of the workpiece 16 and the supply line 18.

To close the current circuit with the power component 3 of the welding unit 1, the user must then place the welding torch 10, in particular the welding wire 13 forming the electrode, in contact with the other input 33, in particular the electrode holder 32, so that a current circuit can be created via across line 17 to supply line 18 with the remote control unit 23 connected in between. Since the current supply unit 46 is arranged in parallel with the switch component 39 between the two inputs 33 and 35 in the embodiment illustrated as an example here, an operating voltage for the individual components of the remote control unit 23 can be applied from the current supply unit 46 because when the welding unit 1 is switched on, a no-load voltage is always applied to the welding torch 10 so that a current circuit is formed from the input 33 via the current supply unit 46 to the input 35 enabling energy to be applied to the current supply unit 46.

By connecting or inter-connecting the remote control unit 23 as a consumer, an energy supply is built up by the power component and a constant current flow can be established because of a constant inherent resistance in the current supply unit 46.

Accordingly, once the components of the remote control unit 23 are supplied with energy, the logic unit 41 activates a data transfer, i.e. by activating the switch component 39, an identification process in the form of a digital, serial data protocol is operated on the welding unit 1 via the welding lines, in particular via the supply lines 17, 18. This identification process or the transmitted data protocol can be recognised by the welding unit 1, in particular by the detection system 31, whereupon the individual digital signals are forwarded directly to the control system 4. The transferred data protocol, in particular the transmitted identification of the remote control unit 23, is evaluated by the control system 4 and is compared with an identification stored in a memory device, for example. If the stored identification matches the transmitted identification, the control system 4 will be able to establish that a remote control unit 23 as proposed by the invention is inter-connected between the two welding lines, in particular the supply lines 17, 18, as a result of which activation of the ignition process can be halted by the control system 4. To this end, it may be, for example, that when the detection system 31 recognises a current flow, the control system 4 activates a pre-settable period by which initiation of the ignition process will be delayed, enabling transmitted data to be evaluated when the remote control unit 23 is in operation.

Since it is possible to detect an inter-connected remote control device 23, different remote control units 23 may be used for a welding unit 1. Additional data could be stored as a means of detecting the individual identification codes of the individual remote control units 23, this additional data being read by the control system 4 so that the functions of the relevant remote control unit 23 can be recognised or assigned. Consequently, the control system 4 is able to ascertain how many additional setting elements 48 to 50 are provided on the remote control unit 23 and what functions these setting elements 48 to 50 perform.

The current flow initiated by the current supply unit 51 must be detected by the welding unit 1, in particular the control system 4 since otherwise, as would be the case with the welding unit 1 known from the prior art, an arc 15 would be ignited, in other words the ignition process initiated, or the control system 4 would fuse assuming a short circuit, as usually happens during a welding process. The remote control unit 23 would be destroyed if a process sequence of this type were initiated due to the high flow of current. However, in order to prevent this from happening, the control system 4 can run an evaluation of the output current flow and the transmitted data protocol by means of software.

This being the case, the control system 4 will be able to sense through the detection system 40 that a constant current is being output or drawn from the power component 3 without a welding process having been initiated, which means that the control system 4 will be able to suppress the ignition process or other process sequences, for example.

The fact that a remote control unit 23 is connected between the welding torch 10 and the workpiece 16 can also be recognised on the basis of the current rating, i.e. an actual/desired comparison of the of the delivered current is run in the control system 4, the level of the current flow having been obtained by the detection system 31 and forwarded to the control system 4, which means that the detection process can be operated on the basis of the current rating. Clearly, the various individual methods used to detect the remote control unit 23 may be combined with one another.

In order to be able to run a digital transmission between the remote control unit 23 and the welding unit 1, in particular the control system 4, the user has the possibility of amending at least one welding parameter using setting unit 44, i.e. a new desired value is set by the user by means of the setting unit 44, which is transmitted to the welding unit 1 in digital format. If a display 47, is provided, the setting for the desired value can be displayed.

The logic unit 41 converts a newly set desired value into a digital data protocol, FIGS. 3 and 4 illustrating an example of such a digital data protocol. The data protocol is serially transmitted with the switch component 39 is activated accordingly. To this end, when the switch component 39 is activated, the schematically illustrated switch is closed causing a current flow to be established from the input 33 across the resistor 38 to the switch component 39 and the input 35. Because a corresponding resistor 38 is operating between the two inputs 33, 35, the current is raised to a predetermined value, as illustrated in FIG. 3. As a result of this increase in current, the logic unit 41 switches to the logical state "1" via the switch component 39. The logical state "0" is obtained by the logic unit 41 by de-activating the switch component 39, which will cause the current signal to be reduced to the original value. By opening and closing the switch component 39, the logic unit 41 is able to control the data transfer to the welding unit 1, i.e. digital levels, in particular "logic 1" and "logic 0" are set up and serially integrated through the switch component 39, thereby forming a data protocol. This data protocol or the individual digital levels are sensed by the detection system 31, triggering an evaluation of the individual states or level combinations and thus enabling the relevant data for setting a welding parameter to be transmitted.

It should be pointed out that the welding unit 1 and the remote control unit 23, in particular the control system 4, and the logic unit 41, must be tuned to one another, i.e. both the logic unit 41 and the control system 4 must be able to recognise the logical states or the "1" and "0" levels. The data determining the structure of the individual digital levels is stored in a memory device for the logic unit 41 and for the control system 4, enabling both the control system 4 and the logic unit 41 to evaluate the digital levels. This data relates to the rating 51 of the current and to a period 52 determining the length of a level. By using an identification code for the remote control unit 23, this data can be incorporated in the transmission when operation is activated so that different characteristic variables of the level may be used for a whole range of different types of remote control unit 23.

Because the data is set for an individual pulse or a level, a bit in a digital transmission can be said to be a rating 51 and period 52 and several individual bits transmitted in sequence will create a corresponding data protocol in a known manner. This definition of a bit is necessary because it may be, during a serial data transmission, that two identical pulses or levels have to be transmitted in series and by using this definition the control system 4 will be able to detect that two or more identical levels or signals can be transmitted in series. The control system 4 and the logic unit 41 will easily be able to detect, on the basis of the stored period, how long the switch component 3 was closed, thereby enabling the number of bits sent in series to be filtered out.

With a remote control unit 23 of this design, a so-called digital data transmission can be operated from the remote control unit 23 to the welding unit 1, i.e. the data transmission is made up of individual bits, which are then evaluated by the control system 4 in the welding unit 1. This is possible because the detection system 31 is provided in the welding unit 1 to detect and sense the current flow so that any increases in current and any interruptions to the current will be detected and forwarded to the control system 4 in the form of digital pulses for evaluation, the data being evaluated by the control system 4 through a software programme.

With this form of data transmission, because data is sent from the remote control unit 23 as a digital serial transmission, the user will be able to set several totally different welding parameters remotely, i.e. the user will be able to select the different welding parameters assigned to the setting elements 48 to 50 by using the setting elements 48 to 50, which means that the user can change the desired value for the selected welding parameter via the setting unit 44. This being the case, the remote control unit 23 can be used to set the welding current, the welding voltage, the wire feed rate, etc., for example. The user merely has to activate one of the setting elements 48 to 50, whereupon the logic unit 41 will recognise which welding parameter has to be amended so that a data protocol corresponding to this welding parameter can then be set by the logic unit 41 and the switch component 39 activated accordingly to inform the welding unit 1 that this welding parameter is to be amended by means of the remote control unit 23.

When using the remote control unit 23 in this type of application, different bit patterns can be stored as codes for the different welding parameters so that when a data transmission is sent by the logic unit 41, this bit pattern is transmitted to the control system 4, enabling the control system 4 to identify the welding parameters which have to be changed. The logic unit 41 will add the new desired value set by the user to the corresponding bit pattern, enabling the different welding parameters to be amended remotely via the remote control unit 23. To this end, the user may set or amend a whole range of different welding parameters by selecting the individual welding parameters in cycles.

FIG. 3 shows an extract from a data protocol used to enter settings remotely from the remote control unit 23. This data protocol gives the signals or levels detected by the detection system 31 for the control system 4.

As may be seen from the data protocol illustrated, the remote control unit 23 is switched into the current circuit of the power component 3 at a time 53, i.e. the input 35 was connected to the workpiece 16 and the input 33 to the welding torch 10, thereby establishing a constant input or drawing of current by the remote control unit 23 at a current rating 54. Once the user has selected one of the welding parameters to be changed using the setting elements 48 to 50 and amended the predetermined desired value from the setting unit 44, he can initiate the data transmission using another setting element 55, as indicated at the time 56. Clearly, it would also be possible for the data to be transmitted immediately, in which case there would be no need to initiate the data transmission using the setting element 55.

From the time 56, a level 57 of a data protocol 58 is presented, which is generated by the logic unit 41 when the switch component 39 is activated, i.e. by closing the switch component 39, the resistor 38 is switched into the current circuit between the welding torch 10 and the workpiece 16, causing an increase in current by the rating 51, thereby generating the digital level 57. To ensure that a clear "logic 1" level 57, in other words a bit, is transmitted, the switch component 39 is activated by the logic unit 41 for the period 52, enabling the detection system 31 of the welding unit 1 to detect a corresponding level 57 during the period 52. This is immediately forwarded to the control system 4. The control system 4 is able to recognise that the level 57 was generated by the remote control unit 23 and forwarded to the current source 2 via the welding cables because of the increase in current flow by the rating 51. The control system 4 simultaneously checks the period 52 for the level 57, as a result of which the control system 4 will know that, once the pre-set period 52 has elapsed, the current will be reduced to the current rating 54 and hence the first level 57, in other words a bit was transmitted. It is necessary to check what the period 52 for a level 57 is because if two identical levels 57 are transmitted in series, the control system 4 will know from the period 52 that two identical levels 57 were transmitted given the twofold period 52.

Since a digital transmission of this type is known per se, the other level 57 will not be explained in detail. However, it can be said that a data protocol can be compiled by transmitting levels 57 in series in this manner and evaluated by the control system 4 using an appropriate computation or software programme. Accordingly, when two identical levels 57 are transmitted in series, in other words two "logic 1" levels or "logic 0" levels, in order to permit the control system 4 to recognise the two levels 57 transmitted in series, the period 52 during which a pulse or level 57 may last is stored in the control system 4 and the logic unit 41 and this period 52 is timed between the logic unit 41 and the control system 4 when the remote control device 23 is switched on so that if the same level 57 is transmitted twice or more, the control system 4 will be able to detect from the period 52 that two or more identical levels 57 were transmitted in series, as is the case with two "logic 1" levels shown in FIG. 3. When two identical levels 57 are transmitted in this way, the switch component 39 is either closed or kept open during the double or multiple period 52.

The advantage of a digital data transmission of this type is that any amount of data can be transmitted to the welding unit 1 using a remote control unit 23 of this type. Accordingly, a whole range of welding parameters can be set from the remote control unit 23.

With a digital remote control unit 23 of this design, a reciprocal data exchange or two-way data exchange can be operated between the welding unit 1 and the remote control unit 23. To this end, another resistor 59 may be provided parallel with the switch component 39—as indicated by broken lines. By incorporating another resistor 59 in a parallel connection with the switch component 39, a current circuit is established across the two serially connected resistors 38, 59 between the inputs 33, 35 at the same time as the current circuit is established via the current supply unit 46 when the remote control unit 23 is switched on, i.e. because the switch component 39 is bridged by the other resistor 59, a constant current flow is generated in turn, which can be changed by activating the switch component 39. This is necessary for a two-way data exchange in the embodiment illustrated here because with the remote control unit 23 illustrated in this example, the detection system 40 is disposed in the current circuit of the switching device 37 so that the digital levels 57 transmitted from the welding unit 1 or from the current source 2 can be detected and recognised by the detection system 40 on this current circuit.

It goes without saying that this additional resistor 59 could be dispensed with if the switch component 39 were disposed in the current supply unit 46 because a constant current circuit could be established via the current supply unit 46 in order to generate the operating voltage. However, this would mean that the detection system 40 would also have to be arranged in the current supply unit 46.

Illustrated more clearly in FIG. 4 is a schematic data protocol 58 for a data transmission but this time from the welding unit 1, in particular the current source 2, to the remote control unit 23, it being possible to operate a two-way data transfer with this embodiment because of the resistor 59 connected in parallel.

As explained above, the remote control unit 23 has a resistor 59 connected in parallel with the switch component 39 for a two-way data exchange so that a constant current flow is established between the two inputs 33, 35 via the switching device 37 of the remote control unit 23. As may be seen at time 53, when the remote control unit 23 is switched on, a constant current output is generated by the serial circuit of the two resistors 38, 59 between the workpiece 16 and the welding torch 10. When switched on, a code is transmitted from the remote control unit 23 to the current source 2 so that the control system 4 knows that no ignition process should be initiated by the current flow.

Another type of system may be used for detecting when the remote control unit 23 has been switched on, which may also be used in combination with the code transmission. Accordingly, when the detection system 31 senses a current flow, the detected current rating 54 delivered from the power component 3 to the remote control unit 23 is forwarded to the control system 4, in particular the microprocessor controller 26, which knows from the specified current rating 54 that the remote control unit 23 is connected as a consumer. Consequently, the control system 4 can suppress initiation of the ignition process or fusing process normally run when the welding wire 13 is placed in contact with the workpiece 16.

As a result of this constant current flow between the inputs 33, 35, a data exchange can be run by the welding unit 1 with the remote control unit 23 in both directions by transmitting current pulses or digital levels 57 of the type described above. This is possible because the remote control unit 23 also has a detection system 40 and is therefore able to recognise the individual current pulses or digital levels 57 as described above and the data protocol can be evaluated by the logic unit 41.

By means of this two-way data exchange, pre-set desired values can be consulted by the welding unit 1 via the remote control unit 23 and these desired values can be changed by the user, from the setting unit 44, and the newly set desired values forwarded to the welding unit 1.

The individual current pulses or "logic 1" levels are formed in such a way that by closing the switch component 39, the parallel connected resistor 59 is short-circuited so that the overall resistance value between the two inputs 33, 35 will change, thereby increasing the current whilst the voltage is maintained constant so that the digital levels 57 can be generated. These digital levels 57 are detected by the two detection systems 31, 40 enabling an evaluation to be carried out.

One advantage of operating with a bi-directional data exchange is that when a desired value is changed, the welding unit 1, in particular the control system 4, can check whether other welding parameters also need to be amended as a result of this change. If such is the case, the control system 4 can indicate or display that this is so to the user via the remote control unit 23, i.e. if changing one of the welding parameters, for example the wire feed rate, for a specific welding process means that the current level also has to be changed in order to produce the same welding performance, the control system 4 of the welding unit 1 will send a data protocol for this setting to the remote control unit 23 and when the logic unit 41 has evaluated this data protocol the user will be alerted, through the display 47, to the fact that this change in the wire feed rate also requires a different current level. This change can be indicated in a simple form on the optical display 47. It would also be possible to activate a loudspeaker or a warning signal unit or lamp to alert the user acoustically or optically to an incorrect setting. The user will then be able to correct this faulty setting by increasing the current, for example. With a two-way data exchange of this type, the user will then have to run test welds when a welding parameter has been changed. There is also the option of transmitting additional information to the user.

In principle, by using a digital data exchange from the remote control unit 23 to the welding unit 1, a whole range of different welding parameters can be changed via the remote control unit 23. The setting elements 48 to 50 can be used in combination with one another for this purpose, for example, and if using setting elements 48 to 40 of this type, a total of sixteen different welding parameters can be stored or selected using only three setting elements 48 to 50, i.e. data corresponding to the sixteen possible settings which can be entered from the remote control unit 23 are stored in the logic unit 41, in particular in a memory device co-operating therewith, so that when the logic unit 41 calls up an option, the welding parameter stored in the memory device is downloaded and shown on the display 47.

At the same time, the logic unit 41 sends a corresponding data protocol to the welding unit 1, whereupon the logic unit 41 notifies the control system 4 that the desired value for the set welding parameter is being transmitted from the control system 4 to the logic unit 41. The control system 4 then transmits the stored desired value or set desired value in a corresponding data protocol by activating the power component 3 to produce current pulses or levels 57 accordingly so that the detection system 40 of the logic unit 41 can evaluate the transmitted desired value. This desired value is subsequently or simultaneously indicated on the display 47 together with the stored welding parameter, so that the user will know, for example, that if letter "1" is indicated the current rating has to be set and if this is followed by the value "250" that the current rating must be set at 250 amperes, enabling the user to change the pre-set desired value which is again transmitted to the welding unit 1 and stored in a memory device for the control system 4 as being the new desired value.

A serial data transmission also offers the possibility of being able to transmit an unlimited number of data, in particular levels 57 in series, enabling user-defined welding settings for the welding unit 1 to be transmitted from the remote control unit 23 so that the welding unit 1 can be set up to operate a totally new welding process.

Another option is one in which the remote control unit 23 is not intelligent and the intelligent aspect is taken over by the control system 4 of the welding unit 1 or the current source 2. This being the case, the logic unit 41 will be set up so that it will operate the switch component 39 and display 47 only. This is possible because with a two-way data exchange, the computations are run between the remote control unit 23 and the welding unit 1 whilst the logic unit 41 runs only the display of the transmitted data. When a setting element 48 to 50 or the setting unit 44 is operated, only a specific data protocol is transmitted and the computation and allocation of the data protocol is taken over by the control system 4. The advantage of this type of solution is that the remote control unit 23 is inexpensive to make. Furthermore, shifting the intelligence, which would otherwise be assigned to the remote control unit 23, to the control system 4 instead facilitates maintenance of the stored software programmes and this means that several remote control units 23, in particular their software programmes or operating programmes, can be maintained simultaneously from the control system.

Clearly, any data protocol known from the prior art may be used for the serial data transmission in data protocol format. The remote control unit 23 may be adapted to any data protocol, in which case the software merely needs to be adapted to the new data protocol.

For the sake of good order, it should finally be pointed out that in order to provide a clearer understanding of the structure of the remote control unit 23, it and its constituent parts have been illustrated out of scale to a certain extent and/or on an enlarged and/or reduced scale.

The tasks underlying the independent inventive solutions can be found in the description. Above all, subject matter relating to the individual embodiments illustrated in FIGS. 1, 2, 3, 4 can be construed as independent solutions proposed by the invention. The tasks and solutions can be found in the detailed descriptions relating to these drawings.

LIST OF REFERENCE NUMBERS

1 Welding unit
2 Current source
3 Power component
4 Control system
5 Switching element
6 Control valve
7 Supply line
8 Gas
9 Gas storage
10 Welding torch
11 Wire feed device
12 Supply line
13 Welding wire
14 Supply drum
15 Arc
16 Workpiece
17 Supply line
18 Supply line
19 Coolant circuit
20 Flow indicator
21 Water container
22 Input and/or output device
23 Remote control unit
24 Inverter current source
25 Data bus
26 Microprocessor controller
27 Lines
28 Lines
29 Connecting socket
30 Connecting socket
31 Detection system
32 Electrode holder
33 Input
34 Electrode holder
35 Input
36 Connecting line
37 Switching device
38 Resistance
39 Switch component
40 Detection system
41 Logic unit
42 Control line
43 Line
44 Setting unit
45 Line
46 Current supply unit
47 Display
48 Setting element
49 Setting element
50 Setting element
51 Rating
52 Period
53 Time
54 Current rating
55 Setting element
56 Time
57 Signal
58 Data protocol
59 Resistance

What is claimed is:

1. Method of exchanging data between an external component consisting of a remote control unit having two inputs, and a current source of a welding unit, comprising the steps of carrying out a serial data exchange between the welding unit and the remote control unit, directly across welding lines constituting connecting lines to a welding torch and to a workpiece, on the basis of digital levels, a two-way data exchange being carried out between the current source of the welding unit, and the external component consisting of the remote control unit, a continuous current flow being established between the two inputs via a switching device of the remote control unit and the digital levels being formed in such a way that when a switch component of the switching device is closed, a total resistance value between the two inputs of the remote control unit is changed.

2. Method as claimed in claim 1, wherein the data exchange is based on a data protocol, and the individual digital levels following one after the other are detected by a detection system.

3. Method as claimed in claim 2, wherein the data protocol is made up of sequential defined digital levels, each digital level, which represents a bit, being defined by a time period.

4. Method as claimed in claim 1, wherein the digital levels detected by the detection system are forwarded to a control system and a logic unit, which then evaluates the serially transmitted data protocol and activates a regulation and control procedure on the basis of the transmitted data.

5. Method as claimed in claim 1, wherein when the switch component is activated, a resistor connected in parallel therewith is short-circuited.

6. Method as claimed in claim 1, wherein by activating the switch component, a current circuit is established in the remote control unit for at least a predefined time period and at a predefined current rating between the inputs of the remote control unit.

7. Remote control unit for a current source of a welding unit, the remote control unit comprising at least one setting unit and a current supply unit, and in order to activate the remote control unit it is placed in contact by means of a respective input with a workpiece and an electrode holder; a digitally programmable logic unit connected to a switching device, which comprises at least one resistor and a switch component, in order to generate digitally sequential levels, the switch component being in turn connected to an input for the electrode holder and the workpiece, and another resistor is connected in parallel with the switch component to form a continuous current flow in the switching device.

8. Remote control unit as claimed in claim 7, wherein the digitally programmable logic unit is a microprocessor controller.

9. Remote control unit as claimed in claim 7, further comprising a detection system in the remote control unit to detect the flow of energy.

10. Remote control unit as claimed in claim 7, wherein the setting unit and a display unit are connected to the digitally programmable logic unit.

11. Remote control unit as claimed in claim 7, wherin one or more setting elements, used to select various welding parameters to be changed, are connected to the digitally programmable logic unit.

12. Remote control unit as claimed in claim 7, wherein the current supply unit is arranged parallel with the switching device, which generates an operating voltage for the individual components of the remote control unit via the energy flow between the inputs for the electrode holder and the workpiece.

13. Remote control unit as claimed in claim 7, wherein the switching device is provided in the current supply unit.

14. Remote control unit as claimed in claim 7, further comprising an adjustable power component in the welding unit or in the current source.

15. Remote control unit as claimed in claim 14, further comprising a microprocessor controller connected to the adjustable power component in order to regulate or control the output power.

16. Remote control unit as claimed in claim 14, wherein the adjustable power component is an inverter current source.

17. Remote control unit as claimed in claim 1, further comprising a detection system in the welding unit or in the current source to detect the current and voltage at the output of the power component.

* * * * *